Jan. 1, 1946. J. D. RAUCH 2,392,188
CLUTCH
Filed Aug. 9, 1943 2 Sheets-Sheet 2
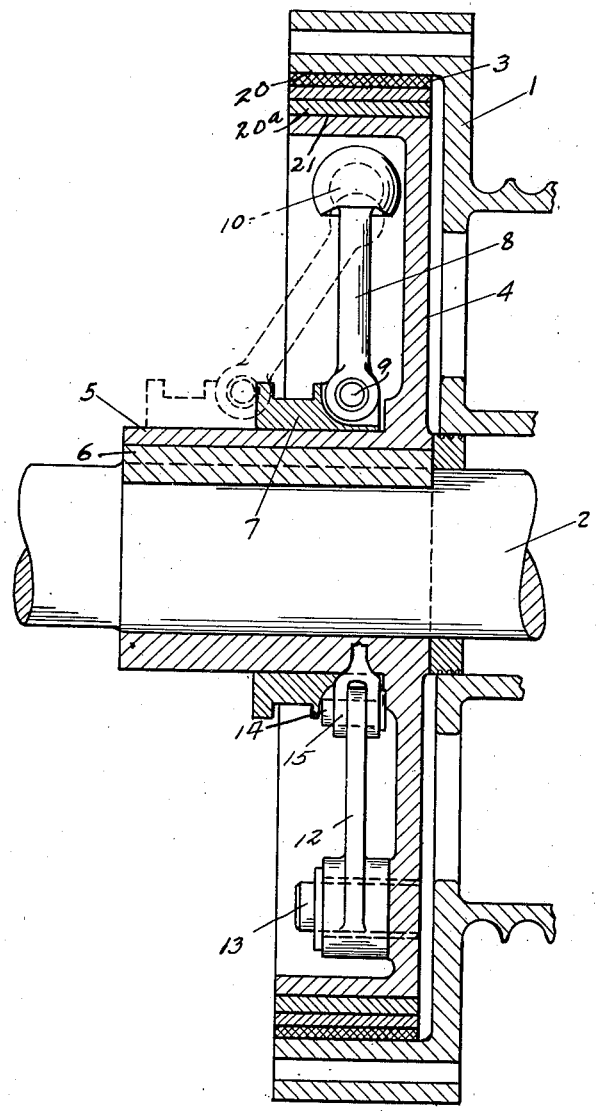
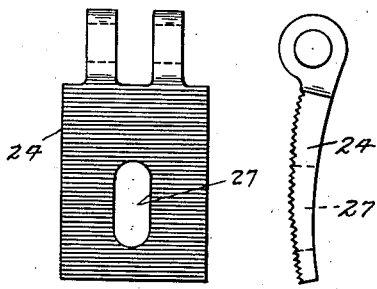
Inventor
John D. Rauch
By Ross & Ross
Attorneys Patented Jan. 1, 1946

2,392,188

UNITED STATES PATENT OFFICE 2,392,188

CLUTCH

John D. Rauch, Fort Wayne, Ind.

Application August 9, 1943, Serial No. 497,975

1 Claim. (Cl. 192—77)

The present invention comprises an improved construction of clutch unit of the internal or expanding band type.

A primary object of the invention has been to provide novel adjusting means for the clutch band for lengthening the same to take up wear. Said adjusting means has been designed with a particular view to affording provisions for quick accessibility to the adjusting parts and for enabling the adjusting to be effected speedily when the said adjustment is required to be made.

A further object of the invention has been to provide certain novel equalizing means carried by the clutch spider for transmitting the thrust of the operating toggles to the live end of the clutch band through a special equalizing bar carried by the spider member of the clutch, thereby to perfectly balance the action of the band in its application to the clutch drum within which it operates.

The invention involves other novel detail features of construction that will appear more fully as this description proceeds and may be fully understood in connection with the accompanying specification together with the annexed drawings, in which—

Figure 2 is a sectional view.

Figure 3 is a plan view of the serrated adjusting link for adjusting the length of the band.

Figure 4 is a side view of said adjusting link.

Figure 1:
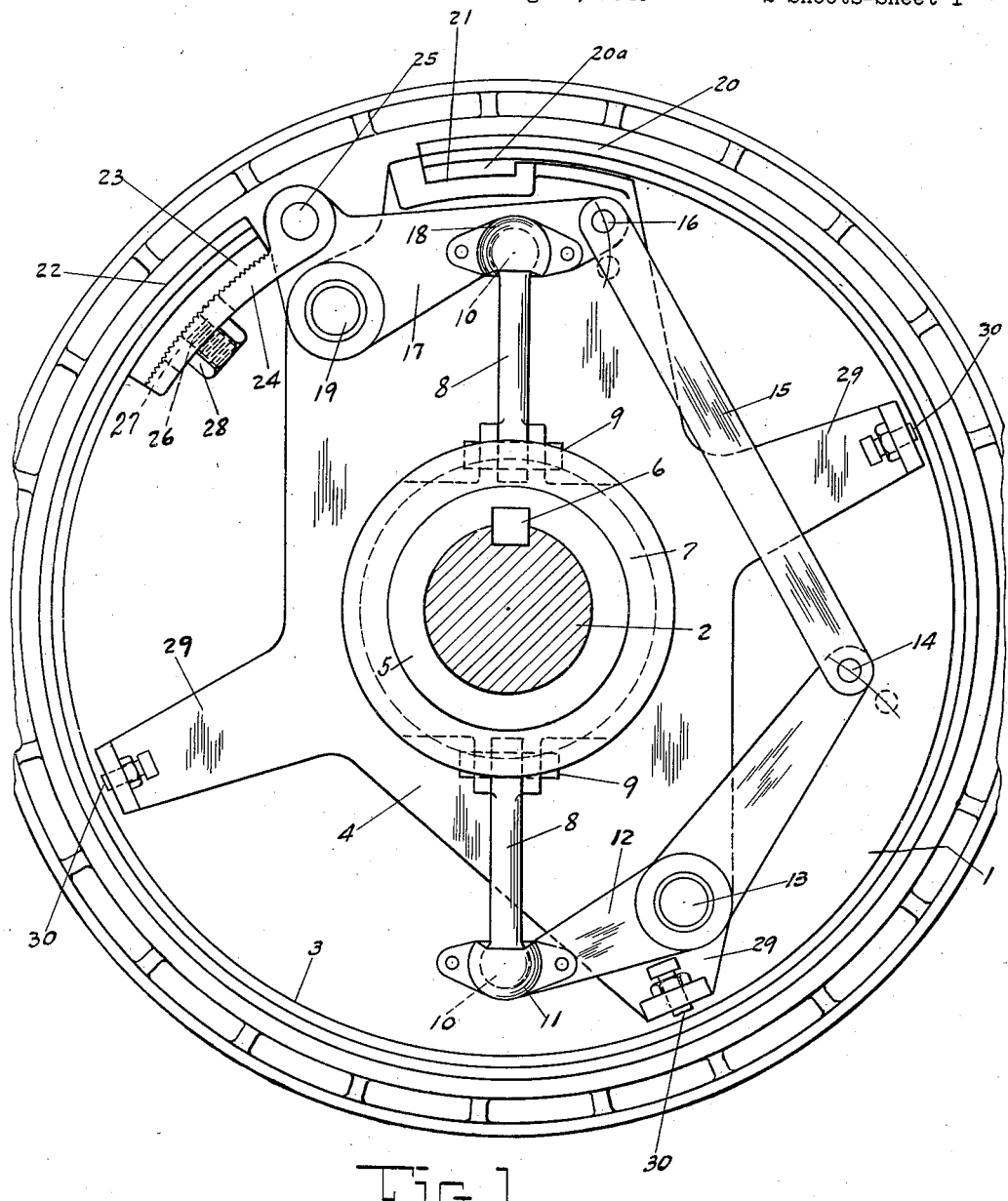
Figure 1 is a side elevational view of a clutch embodying the invention.

The clutch unit of my invention comprises certain conventional parts common in internal expanding clutches of the type to which my invention relates, including primarily the clutch drum 1 to which the drive of the shaft 2 is to be communicated, an internal clutch band 3, and a spider member 4 carrying certain of the clutch actuating parts.

On the hub 5 of the spider 4, which hub is keyed as at 6 to the shaft 2, is carried the slide yoke 7 movable longitudinally of the hub inwardly and outwardly relatively to the spider 4 as indicated by dotted lines in Figure 2. Engaged with the slide or actuating yoke 7 are suitable toggles 8 connected by pivot pins 9 as usual, and having socket heads 10 at their outer ends. One of the toggles 8 has its socket head 10 fitting in a socket 11 on the dead lever 12 which is pivoted between its ends at 13 on an arm of the spider 4. The dead lever 12 is connected pivotally at 14 with an equalizing bar or link 15 which in turn is connected pivotally at 16 to the live or push lever 17. The other of the toggles 8 has its socket head fitted in a socket 18 on the long arm of the live lever 17 intermediate the point of pivotal support of said lever on a trunnion 19 carried by the spider 4, and the pivotal point 16 previously referred to.

The clutch band 3 is equipped with the dead end 20 interlocked at 20a by a lug fitting in a recess 21 formed in a peripheral portion of the spider 4. The live end of the band 3 generally designated 22 is provided with a fixed serrated adjusting plate 23, the teeth or serrations of which are adapted to interengage teeth or serrations on the adjusting link 24, which adjusting link is pivotally connected at 25 to the live levers 17.

For attaching the link 24 to the adjusting plate 23 there is provided a stud 26 projecting from the plate 23 through an elongated opening or slot 27 in the body portion of the adjusting link 24. A suitable nut 28 adapted to be screwed upon the stud 26 is designed to clamp the parts 24 and 23 together with their teeth interlocked.

The foregoing describes the general construction of my clutch mechanism though it is notable that spider arms 29 extend from the spider and are equipped with adjustable or set screws 30 cooperative with the band 3 internally thereof to prevent buckling of the latter.

It will be seen that the operation of the clutch is simple in that by movement of the clutch yoke 7 under the actuation of a suitable clutch lever engaged therewith, but not shown, said yoke may be moved toward the spider 4 thereby pushing outwardly on the toggles 8. This action causes a rocking of the dead lever 12 and transmitting of the movement of said lever through the equalizing bar or link 15 to the outer end of the long arm of the outer lever 17, tending to rock said lever 17 for shifting of the pivot 25, seen in Figure 1, to the left, thereby to expand and apply the brake band 3 to the drum 1. As the toggle 8 cooperating with the lever 12 performs the above function, the other toggle 8 directly cooperating with the lever 17 will push on the lever 17 similarly to the push transmitted from the lever 12 for obtaining the same effective expanding applying action of the brake band 3, the arrangement of the parts being such that the thrust of the yoke 7 is distributed equally to each of the toggles and the energy transmitted to the double end lever 12 is converted to a push action on the live lever 17 at the same time as a corresponding action is imparted to the live lever 17, from its cooperating toggle, the action of the clutch being thus perfectly balanced in its working operation.

Whenever it is desired to adjust the clutch band 3 to accommodate for wear thereon, the said band may be lengthened by loosening the nut 28 separating the plate 23 from the adjusting link 24 at the toothed portions of these parts, adjusting the parts 23 and 24 to engage their teeth after elongation of the band 3, and thereupon replacing the nut 28 for clamping the parts 23 and 24 together.

Having thus described my invention, what I claim as new and desire to secure by Letters Patent of the United States, is:

In a clutch of the class described, in combination, a clutch drum, an expanding clutch band disposed within the drum and cooperative therewith, a shaft on which the drum is supported, a spider keyed to the shaft and associated with the drum, a lug on one end of the band interlocking with the spider to provide a dead end for the band, a live lever pivoted to the spider and having a band actuating arm connected with the live end of the band, a clutch yoke movable longitudinally of the shaft, a dead lever pivoted intermediate its ends to the spider, an equalizing bar connecting one end of the dead lever to said live lever, and toggle means between the clutch yoke and the live lever and the dead lever for simultaneously operating the said levers to directly actuate the live lever from said clutch yoke and indirectly acutate said live lever from the dead lever through the equalizing bar to distribute the forces transmitted by the toggle members to the clutch band with balanced effect, the connection between the live lever and the live end of the band comprising an outstanding arm extending from the live lever, a slotted adjusting link connected with said arm, and a detachable and adjustable connection between said link and the live end of the band, including a serrated plate attached to the live end of the band, a serrated portion on the adjusting link engaging the serrations of the plate, and an adjustable and detachable clamping connection between the plate and said adjusting link comprising a stud projecting from the plate between its ends and passing through the slotted portion of adjusting link in a direction radially toward the shaft, and a nut screwed on said stud.

JOHN D. RAUCH.